April 27, 1948.  A. G. OBLAD  2,440,414
PRODUCTION OF CYCLOHEXANE
Filed Dec. 3, 1945
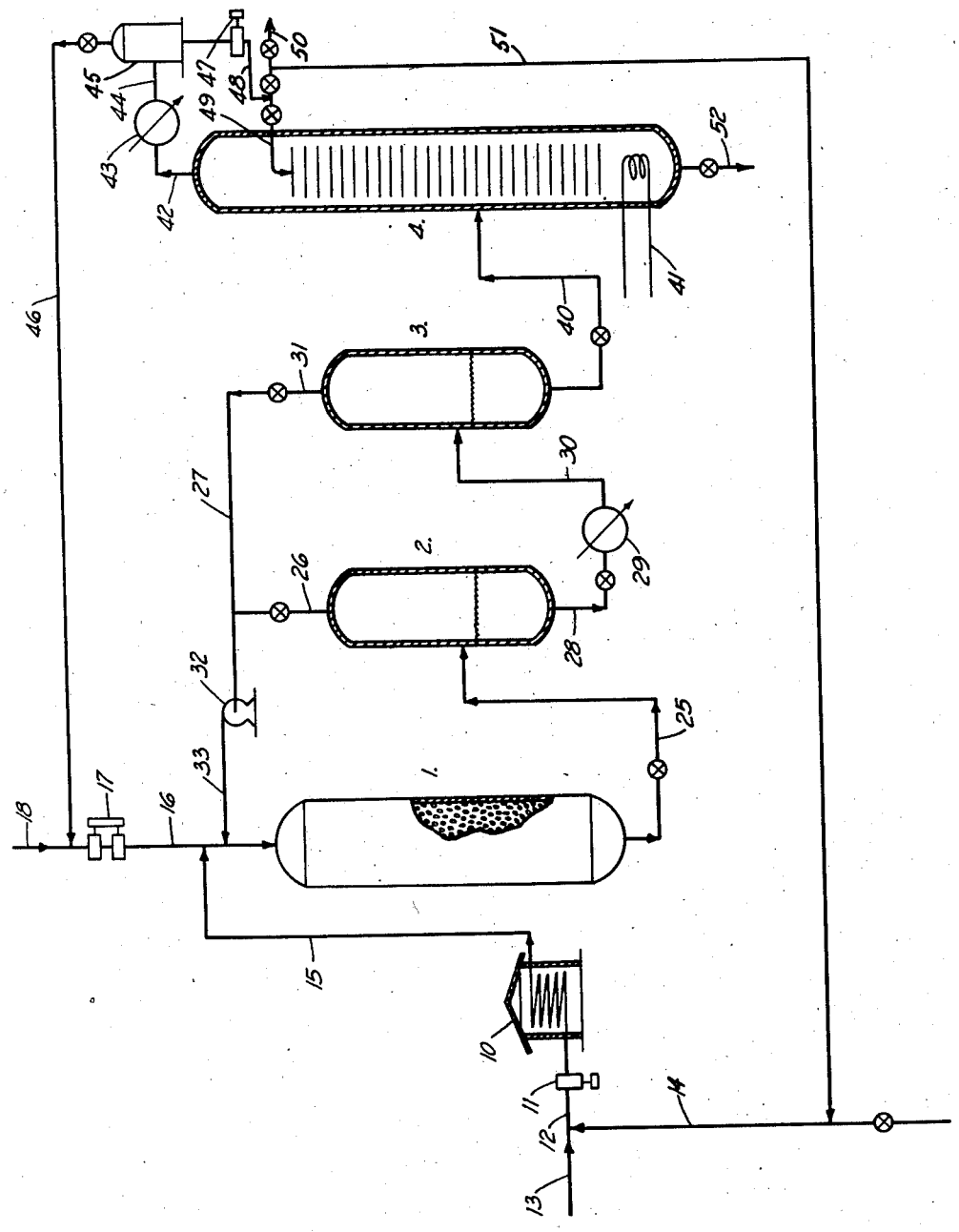
Alex G. Oblad
INVENTOR
BY John C. Stauffer
ATTORNEY Patented Apr. 27, 1948

2,440,414

UNITED STATES PATENT OFFICE 2,440,414

PRODUCTION OF CYCLOHEXANE

Alex G. Oblad, Dallas, Tex., assignor, by mesne assignments, to Socony-Vacuum Oil Company, Incorporated, New York, N. Y., a corporation of New York Application December 3, 1945, Serial No. 632,546

4 Claims. (Cl. 260—667)

This invention relates to the manufacture of cyclohexane of high purity by the hydrogenation of benzene and more particularly to a novel process wherein benzene is catalytically hydrogenated at only moderately high pressures to produce a substantially benzene-free cyclohexane product.

In the preparation of cyclohexane by the hydrogenation of benzene it is difficult to hydrogenate the benzene completely unless pressures in excess of 2000 or 3000 pounds per square inch are employed and unless the reactants are highly purified. Very active catayIsts which are relatively sensitive to deactivation must be used to obtain complete conversion of benzene to cyclohexane in a single pass. Hence, the more advantageous method of carrying out the hydrogenation has been to carry out the process by taking a 90 to 95 percent conversion and separating unreacted benzene from the cyclohexane product by solvent extraction methods or by the use of an azeotropic agent in making this separation by fractionation. Agents well known to the art are isopropyl alcohol, acetone, and methyl acetate. Solvents which may be used to separate the benzene for recycle from the cyclohexane product are liquid sulfur dioxide, furfural and phenol. In general, the use of solvents has proved to be unsatisfactory and not adaptable for continuous operation. Likewise, the use of alcohols and other oxygen containing compounds as azeotropic agents has not been entirely satisfactory since these agents must be removed from the benzene by extraction with a solvent and the agent must then be reconcentrated, which step adds to the cost of the process.

It is an object of this invention to overcome the disadvantages of the prior art and produce relatively pure cyclohexane from benzene by means of catalytic hydrogenation. Another object of this invention is to provide a continuous process for producing cyclohexane from benzene by hydrogenation at moderate pressures. A further object of this invention is to obtain relatively pure cyclohexane substantially free of non-hydrogenated benzene by an azetropic agent which can be recycled along with the associated benzene to the hydrogenation reactor, thus avoiding the intermediate separation of azetropic agent from said benzene. Other objects and advantages of the invention will be apparent from the following specification in which the preferred embodiment and details are described.

My improved process consists of catalytically hydrogenating benzene in the presence of methyl-cyclopentane which serves in the coordinated azeotropic distillation step as an agent for removing unconverted benzene from the cyclohexane product. The methylcyclopentane-benzene azeotrope is recycled to the hydrogenation reaction zone. I use an all hydrocarbon system in which the methylcyclopentane may be recycled from the distillation step through the hydrogenation zone without adversely affecting the hydrogenation reaction therein, thus avoiding the loss of azeotropic agent incurred by the necessity of separation of recycle benzene therefrom.

Methylcyclopentane forms with benzene an azeotrope which boils at 71.5° C. at atmospheric pressure, that is, about nine degrees centigrade below the boiling point of benzene and of cyclohexane. The composition of this azeotrope is approximately 90 mole percent methylcyclopentane and 10 mole percent benzene. The composition of the azeotrope varies somewhat with the pressure at which the distillation is carried out. Thus, at about five pounds absolute pressure the composition of the azeotrope is about 91 mole percent methylcyclopentane and 9 mole percent benzene while the azeotrope is richer with respect to benzene content at distillation pressures above atmospheric and may contain as much as 14 mole percent of benzene when the fractionation is carried out at pressures of 100 to 150 pounds gage or about 12 mole percent benzene at pressures of 50 to 75 pounds gage. Hence, for the recovery of benzene from a hydrocarbon mixture the amount of methylcyclopentane in the mixture should fall within the range of from about 10.2 moles per mole of benzene in the mixture for sub-atmospheric pressure fractionation to about 6 moles of methylcyclopentane per mole of benzene at high fractionation pressures and about 7.4 or 7.5 moles of methylcyclopentane per mole of benzene for moderate pressure fractionation. In general, it is desirable to maintain a small excess of methylcyclopentane over that required to form the azeotropic mixture in order to insure complete removal of benzene. The amount of methylcyclopentane to be added may be readily adjusted to correspond to the operating conditions of the azeotropic fractionation.

Substantially all of the unconverted benzene can be removed from a 95 percent cyclohexane-5 percent benzene hydrogenated benzene product mixture by adding thereto from about 7.4 to 9.0 moles of methylcyclopentane per mole of benzene in said product mixture and fractionating off the azeotrope at pressures from atmospheric up to 50 or 75 pounds per square inch. The benzene of this azeotrope fraction can be hydrogenated to cyclohexane along with fresh benzene feed to the hydrogenation zone. The methylcyclopentane is inert to the hydrogenation reaction at the conditions employed although a part of this component may be isomerized to cyclohexane thus producing an increased yield of the desired product.

In the hydrogenation step of my process, I subject the mixture of benzene and benzene-methylcyclopentane azeotrope from previous fractionations to a temperature within the range of from about 70° C. to about 250° C., preferably about 180° C. to 220° C. in the presence of hydrogen and a hydrogenation catalyst such as nickel supported on pumice or on other porous but relatively inactive support. I may also use a catalyst which is less sensitive to poisons. Thus, I may use molybdenum sulfide, molybdenum oxide supported on alumina or supported on acid treated clay such as fuller's earth or attapulgus clay. Somewhat higher temperatures are required for these less active catalysts. The hydrogenation is carried out continuously, preferably in liquid phase, by passing the mixture of carbocylic hydrocarbons and hydrogen over a bed of the catalyst in a tower at a space velocity within the range of from about 1 to 10 volumes of liquid hydrocarbon per volume of free catalyst space per hour. The hydrogenation reactor is maintained at a pressure within the range of from about 100 pounds to 1000 pounds gage, preferably from about 500 to about 800 pounds per square inch. The amount of hydrogen added to the hydrocarbons is at least three moles per mole of total benzene including fresh benzene feed and benzene in the recycled azeotrope. I may use as much as 12 or 15 moles of hydrogen per mole of benzene in the total feed passing to the hydrogenation zone.

One mode of conducting the process of my invention continuously is illustrated diagrammatically in the accompanying drawing of which numeral 1 represents the catalyst packed hydrogenation reactor, 2 and 3 represent hot and cold settlers respectively wherein hydrogen is separated from the hydrogenated product and 4 represents a suitable fractionation tower. A mixture comprising benzene and methylcyclopentane in the ratio of from 10 to about 14 moles of benzene per 90 moles to about 86 moles of methylcyclopentane is passed to furnace 10 by means of pump 11 in line 12 which connects with benzene feed line 13. Methylcyclopentane is introduced to the system through line 14 either as a relatively narrow cut from a virgin light naphtha stream or in the form of the methylcyclopentane-benzene azeotrope as described hereinbelow. In furnace 10 the mixture is raised to a temperature somewhat above the operating temperature of the hydrogenator in order that the mixture of liquid hydrocarbons and hydrogen therein may be maintained within the range of 180° C. to 220° C. The mixture of heated hydrocarbons passes from furnace 10 through line 15 to line 16 which leads to reactor 1. In reactor 1 the hydrocarbons are mixed with at least three moles of hydrogen and preferably about 10 moles of hydrogen per mole of benzene in the liquid feed stream. Hydrogen is introduced to line 16 by means of compressor 17 which picks up hydrogen from an external source introduced to the system through line 18.

The mixture of reactants is passed, either downflow or upflow, in contact with the catalyst in tower 1 at a temperature within the range of 180° C.–220° C. and at a pressure preferably in excess of 500 pounds per square inch. I prefer to operate with space velocities such that at least 90 percent of the benzene is converted to cyclohexane. The space velocity in tower 1 is preferably adjusted to give from about 95 to 98 percent conversion. Conversions as high as 99.5% may be practicably obtained in which case the total amount of methylcyclopentane introduced as such or as the benzene azeotrope through line 14 is much reduced since the amount of methylcyclopentane required is directly proportional to the amount of benzene escaping conversion in tower 1. Thus, at 90 percent conversion of 100 moles of benzene, ten moles of benzene remain unconverted which if the fractionation of the product is carried out at atmospheric pressure will require the addition of about 90 moles of methylcyclopentane to remove said unconverted benzene from the cyclohexane product in fractionator 4. On the other hand, if 99.5 moles of the benzene are converted only about 4.5 moles of methylcyclopentane per 100 moles of benzene feed to reactor 1 need be used. Less methylcyclopentane will be required if the fractionation is carried out at higher pressures.

The reaction mixture passes from reactor 1 through line 25 to hot settler 2 without substantial reduction in pressure or temperature. In settler 2 undissolved hydrogen separates from the liquid product and passes through line 26 to hydrogen recycle line 27. The liquid product from settler 2 passes through line 28, cooler 29 and line 30 to cold settler 3 which is operated at substantially the same pressure as hot settler 2. In cooler 29 the temperature of the liquid reaction product is lowered to the range of 100° C.–125° C. and as a result of the lower temperature a substantial part of the hydrogen dissolved therein at the higher temperature is freed from liquid product which settles out as a separate layer in the bottom of settler 3. The hydrogen thus freed passes through overhead line 31 which connects with hydrogen recycle line 27. Hydrogen in line 27 is picked up by centrifugal compressor 32 and is recycled by line 33 to feed line 16. The principal advantage of operating a hot settling zone and also a cold settling zone without substantial reduction in pressure, which type of operation is made possible because of the peculiar solubility properties of hydrogen in liquid hydrocarbons, lies in the reduced compression duty of compressors 17 and 32. This method of separating hydrogen from a hydrocarbon solution of hydrogen by cooling the solution is taught and claimed by W. B. Kay in U. S. 2,357,521.

Liquid product from settler 3 is withdrawn through valved line 40 and passes to fractionator 4, with or without an intermediate heating step, for separation of residual dissolved hydrogen and the methylcyclopentane-benzene azeotrope from the cyclohexane product. Tower 4 which may be operated at a pressure within the range of from about atmospheric to about 50 pounds per square inch or even higher pressure is equipped with bottom heating means 41. I prefer to operate tower 4 at a pressure of at least 30 pounds gage since the use of pressure favors the more complete separation of the azeotrope and also reduces the amount of methylcyclopentane to be added to the mixture. The azeotrope is withdrawn from fractionator 4 as overhead through line 42 and passes through condenser 43 and line 44 to reflux drum 45. Hydrogen passes through line 46 to makeup hydrogen feed line 18. Liquid azeotrope is withdrawn from the bottom of drum 45 by means of pump 47 in line 48, a part of the azeotrope being returned through line 49 as reflux and at least the major part of the remaining azeotrope is recycled through lines 50, 51, 14 and 12 to furnace 10. The benzene of the azeotrope in this recycle stream is hydrogenated in reactor 1 and such hydrogenation results in the production of additional cyclohexane while the methylclopentane passes through the reaction zone unchanged except that a small amount of the methylcyclopentane is isomerized to cyclohexane product, the amount of such isomerization depending on the catalyst used in the hydrogenation process, on the space velocity, and on the temperature conditions maintained in reactor 1.

Cyclohexane product, which is substantially free of benzene, is withdrawn as a bottom product from tower 4 through line 52. Any higher boiling hydrocarbon or hydrocarbons contained in the cyclohexane product which are introduced to the system with the methylclopentane cut may be removed therefrom by fractionation.

Where the methylcyclopentane is obtained by simple fractionation as a cut from virgin naphtha there may be present in such cut some normal hexane, the amount depending on the closeness of fractionation employed in separating the methylcyclopentane cut. Normal hexane forms with benzene an azeotrope mixture which boils at about 60° C. at atmospheric pressure. This azeotrope since it is lower boiling than the principal methylcyclopentane-benzene azeotrope may be readily separated therefrom along with overhead hydrogen and the methylcyclopentane-benzene azeotrope. The benzene-hexane azeotrope is small in amount since additional hexane in any case is introduced to the process only as an impurity in the methylcyclopentane makeup, which makeup is small once the operating conditions in reactor 1 are set for a given conversion and the fractionation pressure in fractionator 4 is chosen for most efficient operation. The lower boiling azeotrope may be recycled along with the methylcyclopentane azeotrope at least until such time that the normal hexane content of the azeotropic mixture becomes excessive at which time the azeotropes may be separated by withdrawing the methylcyclopentane-benzene azeotrope as a side stream, the lower boiling azeotrope only being taken overhead with the hydrogen. The benzene of the lower boiling azeotrope may be recovered from the normal hexane by solvent extraction and returned to the system.

If desired, the methylcyclopentane maye be obtained as the benzene azeotrope from a suitable virgin naptha cut. If such method is used the methylcyclopentane is introduced to the system as the azeotrope and hence contamination with normal hexane may be avoided.

The following example illustrates the completeness of benzene removal from a mixture consisting of a major part of cyclohexane and benzene such as obtained in the above hydrogenated product.

A liquid mixture of 14.3 volumes of methylcyclopentane, 1.2 volumes of benzene, and 22.7 volumes of cyclohexane ($n_D^{25}$ 1.4233) was fractionated in a 100-plate column at about 5 pounds absolute pressure. About 16 volumes (liquid basis) of azeotrope boiling at about 70° C. were taken overhead, which azeotrope had a benzene content of about 9.0 mole percent, the remainder being methylcyclopentane. About 22 volumes of liquid cyclohexane having a refractive index of $n_D^{25}$ 1.4233 was recovered as bottoms from the column, indicating the recovery of very pure cyclohexane from the benzene containing feed to the column.

Obviously, the methylcyclopentane need not be added initially to the benzene feed stream through lines 14 and 12 but can be added directly to line 40 leading to fractionator 4 and then recycled as the azeotrope, or in a process wherein conversion of benzene is carried to 99% or higher the small amount of benzene may be recovered from the azeotrope by solvent extraction, in which case the methylcyclopentane need not be passed through the hydrogenation zone. However, I prefer to recycle the methylcyclopentane-benzene azeotrope.

My process provides an all hydrocarbon system for the efficient preparation of relatively pure cyclohexane. The azeotropic agent is a readily available cheap material, the separation of which from the azeotrope requires no added step, which step is required in processes previously known to the art and which added step disrupts the continuous nature of a process such as that described.

While I have described in detail a specific example of my invention it should be understood that this description is illustrative and not by way of limitation. Different operating conditions may be employed and alternative arrangements of apparatus may be used. Numerous modifications and alterations will be apparent to those skilled in the art from the above description.

I claim:

1. The process for the manufacture of cyclohexane which comprises the steps of (1) reacting a hydrocarbon stream containing benzene and methylcyclopentane with hydrogen to convert a major portion of said benzene to cyclohexane, (2) fractionating the product stream of step 1 to obtain a stream consisting of an azeotrope of methylcyclopentane with benzene and a substantially benzene-free stream containing cyclohexane, (3) recycling the stream of methylcyclopentane-benzene azeotrope of step 2 to step 1, and (4) recovering the cyclohexane substantially free from benzene.

2. The process for the production of cyclohexane from benzene which comprises the steps of (1) passing a hydrocarbon mixture comprising benzene and methylcyclopentane-benzene azeotrope in contact with a hydrogenation catalyst in the presence of at least three moles of hydrogen per mole of benzene in said mixture in a reaction zone at a temperature within the range of from about 70° C. to about 250° C. and at a pressure within the range of from about 100 pounds to about 1000 pounds per square inch to convert a substantial proportion of the benzene to a cyclohexane product mixture containing unconverted benzene and methylcyclopentane, (2) separating a part of the unreacted hydrogen of step 1 from the liquid product mixture of step 1, (3) fractionally distilling the liquid product of step 2 to obtain separate streams of any remaining hydrogen, methylcyclopentane-benzene azeotrope and substantially benzene-free cyclohexane, (4) recycling at least a part of the hydrogen separated in steps 2 and 3 and the methylcyclopentane-benzene azeotrope stream of step 3 to step 1, and (5) recovering cyclohexane from step 3 of the process.

3. The method of manufacturing cyclohexane from benzene which comprises the steps of: (1) catalytically hydrogenating a stream consisting essentially of benzene and methyl cyclopentane obtained in the manner hereinafter described with free hydrogen to convert at least 90% of the benzene to cyclohexane, (2) fractionating the mixture of cyclohexane, unconverted benzene and methyl cyclopentane obtained from step 1 to obtain an overhead consisting of benzene and methyl cyclopentane and a bottom fraction consisting essentially of cyclohexane, (3) recycling the overhead fraction to step 1 in admixture with fresh benzene feed and (4) recovering the cyclohexane product from the bottom fraction.

4. The method of manufacturing cyclohexane from benzene which comprises the steps of: (1) catalytically hydrogenating a stream consisting essentially of benzene and methyl cyclopentane containing a sufficient quantity of methyl cyclopentane to form an azeotrope with any unreacted benzene under the fractionating conditions prevailing in the fractionating step hereinafter described and obtained in the manner hereinafter described with free hydrogen to convert at least 90% of the benzene to cyclohexane, (2) fractionating the mixture of cyclohexane, unconverted benzene and methyl cyclopentane obtained from step 1 in a fractionating step to obtain an overhead consisting of benzene and methyl cyclopentane and a bottom fraction consisting essentially of cyclohexane, (3) recycling the overhead fraction to step 1 in admixture with fresh benzene feed and any necessary make-up methyl cyclopentane, and (4) recovering cyclohexane product from the bottom fraction.

ALEX G. OBLAD.

REFERENCES CITED

The following references are of record in the file of this patent:

UNITED STATES PATENTS

| Number | Name | Date |
|---|---|---|
| 2,356,240 | Hamlin | Aug. 22, 1944 |
| 2,382,446 | Ross et al. | Aug. 14, 1945 |

FOREIGN PATENTS

| Number | Country | Date |
|---|---|---|
| 487,285 | Great Britain | June 17, 1938 |

OTHER REFERENCES

"Azeotropic Distillation," by Ewell, Harrison and Berg, Industrial and Engineering Chemistry, 1944, vol. 36, No. 10, pages 871-875. (U. S. Scientific Library, Patent Office, and 202/42-M, Div. 25.)